US008327868B2

(12) United States Patent
Lammers

(10) Patent No.: US 8,327,868 B2
(45) Date of Patent: Dec. 11, 2012

(54) CYLINDER VALVE WITH THERMAL RELIEF FEATURE

(75) Inventor: Daniel A. Lammers, Fenton, MO (US)

(73) Assignee: Control Devices, LLC, St. Louis, MO (US)

( * ) Notice: Subject to any disclaimer, the term of this patent is extended or adjusted under 35 U.S.C. 154(b) by 856 days.

(21) Appl. No.: 12/478,500

(22) Filed: Jun. 4, 2009

(65) Prior Publication Data
US 2010/0308060 A1 Dec. 9, 2010

(51) Int. Cl.
*F16K 17/38* (2006.01)
(52) U.S. Cl. .......................................... 137/74; 220/89.4
(58) Field of Classification Search .................... 137/72, 137/74; 251/146.6, 368; 220/89.4
See application file for complete search history.

(56) References Cited

U.S. PATENT DOCUMENTS

| 1,211,173 | A | * | 1/1917 | King | 137/74 |
| 1,303,248 | A | * | 5/1919 | Breidenbach | 137/74 |
| 1,687,209 | A | * | 10/1928 | Holmes | 137/74 |
| 2,172,311 | A | * | 9/1939 | Thomas | 220/89.4 |
| 2,302,029 | A | * | 11/1942 | Hulsmann | 137/72 |
| 2,304,491 | A |  | 12/1942 | Allen |  |
| 2,341,579 | A | * | 2/1944 | Sundstrom | 220/89.4 |
| 2,357,620 | A | * | 9/1944 | Thomas | 220/89.4 |
| 2,461,940 | A | * | 2/1949 | Sundstrom | 220/89.4 |
| 4,628,953 | A | * | 12/1986 | Correll et al. | 137/74 |
| 4,744,383 | A |  | 5/1988 | Visnic |  |
| 5,048,554 | A |  | 9/1991 | Kremer |  |
| 5,161,738 | A | * | 11/1992 | Wass | 137/72 |
| 5,213,128 | A |  | 5/1993 | Baird |  |
| 5,255,809 | A |  | 10/1993 | Ervin |  |
| 5,419,357 | A |  | 5/1995 | Lhymn |  |
| 5,495,865 | A |  | 3/1996 | Wass |  |
| 5,511,576 | A |  | 4/1996 | Borland |  |
| 5,562,117 | A | * | 10/1996 | Borland et al. | 137/74 |
| 5,562,118 | A |  | 10/1996 | Cross |  |
| 5,632,297 | A |  | 5/1997 | Sciullo |  |
| 5,647,390 | A |  | 7/1997 | Wass |  |
| 5,775,360 | A |  | 7/1998 | Hayashi |  |
| 6,006,774 | A |  | 12/1999 | Lhymn |  |
| 6,543,472 | B2 |  | 4/2003 | Stafford |  |
| 7,111,818 | B2 |  | 9/2006 | Takeda |  |
| 2003/0217770 | A1 |  | 11/2003 | Schultz |  |
| 2005/0263208 | A1 |  | 12/2005 | MacNeal |  |

* cited by examiner

*Primary Examiner* — John Rivell
(74) *Attorney, Agent, or Firm* — Senniger Powers LLP

(57) ABSTRACT

A cylinder valve for use with a cylinder containing fluid under pressure includes a valve body configured for releasable connection to the cylinder. The valve body has a flow passage extending through the valve body for fluid communication with an interior of the cylinder when the valve body is connected to the cylinder. A valve in the flow passage is movable between open and closed positions. A vent passage is in the valve body and is separate from the flow passage. A temperature relief insert is in the vent passage. The insert includes an insert body, a bore through the insert body, and a thermal relief material in the bore blocking flow through the bore until a predetermined venting temperature is reached. The valve body does not contain brass and the insert body is brass covered by a metal plating not containing brass.

11 Claims, 5 Drawing Sheets

CYLINDER VALVE WITH THERMAL RELIEF FEATURE

FIELD OF THE INVENTION

The present invention generally relates to cylinder valves, and more particularly to a cylinder valve for use with cylinders containing a gas under pressure.

BACKGROUND OF THE INVENTION

Sensors are used to monitor the permissible levels of certain gases (e.g., hydrogen sulfide) in working environments. These sensors must be tested from time to time to make sure they are sufficiently sensitive to the presence of such gases. One test method involves the use of a cylinder containing a mix of gases including trace amounts of the gas or gases to be monitored. The gaseous mixture is released from the cylinder in the vicinity of the sensor to confirm that the sensor is working and that it is properly calibrated. To insure accurate test results, it is important that the mixture of gases in the cylinder remains stable over time.

In conventional cylinder designs, a valve with a thermal relief feature is connected to the cylinder to vent the cylinder in the event of excessive heat. One such valve 1, shown in FIG. 1, comprises a valve body 3 and check valve components 5 constructed of nickel-plated brass. The valve body 3 has a vent passage 7 containing a plug of solder 9 which melts when heated above a predetermined temperature. A significant number of cylinders contain reactive gases (e.g., hydrogen sulfide) that will react with copper. Since brass contains a significant amount of copper, it is undesirable to have such reactive gases come into contact with the brass in the relief valve 1. Although the valve body 3 and check valve components 5 are plated with nickel to shield the brass from the gas in the cylinder, small chips or holes in the plating can allow the gas to contact the brass. Any such contact can potentially change the concentration of the trace gases in the cylinder, which will adversely affect the test procedures discussed above.

There is a need, therefore, for an improved cylinder valve having a thermal relief feature, where the valve is designed to avoid any adverse affect on the stability of the gaseous mixture in the cylinder.

SUMMARY OF THE INVENTION

In one embodiment, the present invention is directed to a cylinder valve with a thermal relief feature for use with a cylinder containing fluid under pressure. The cylinder valve comprises a valve body configured for releasable connection to the cylinder. The valve body has a front end, a back end, a flow passage extending through the valve body from the front end to the back end for fluid communication with an interior of the cylinder when the valve body is connected to the cylinder, and valve body surfaces which are exposed to fluid in the cylinder when the valve is connected to the cylinder. A valve in the flow passage is movable between open and closed positions. A vent passage is in the valve body and is separate from the flow passage for venting fluid under pressure from the cylinder. The cylinder valve further comprises a temperature relief insert in the vent passage. The insert comprises an insert body, a bore through the insert body, and a thermal relief material in the bore blocking flow through the bore until a predetermined venting temperature is reached whereupon the thermal relief material is adapted to change from a solid state to a more liquid state to allow venting of the cylinder through the bore and the vent passage. The valve body does not contain brass and the insert body comprises brass covered by a metal plating not containing brass.

In another embodiment, the invention is directed to a cylinder containing a gaseous mixture under pressure, including a calibration gas, and a cylinder valve with a thermal relief feature installed on the cylinder. The cylinder valve comprises a valve body having a releasable connection with the cylinder. The valve body has a front end, a back end, and a flow passage extending through the valve body from the front end to the back end to provide fluid communication with an interior of the cylinder. A valve in the flow passage is movable between open and closed positions. A vent passage is in the valve body and is separate from the flow passage for venting fluid under pressure from the cylinder. The cylinder further comprises a temperature relief insert in the vent passage. The insert comprises an insert body, a bore through the insert body, and a thermal relief material in the bore blocking flow through the bore until a predetermined venting temperature is reached whereupon the thermal relief material is adapted to change from a solid state to a more liquid state to allow venting of the cylinder through the bore and the vent passage. The valve body does not include any metallic material reactive with the calibration gas. The insert body comprises a metallic material reactive with the calibration gas, and a metal plating covering the metallic material not reactive with the calibration gas.

In yet another embodiment, the present invention is directed to a cylinder valve with a thermal relief feature for use with a cylinder containing fluid under pressure. The cylinder valve comprises a valve body configured for releasable connection to the cylinder. The valve body has a flow passage extending through the valve body for fluid communication with an interior of the cylinder when the valve body is connected to the cylinder. A valve in the flow passage is movable between open and closed positions. A vent passage is in the valve body and is separate from the flow passage for venting fluid under pressure from the cylinder. The cylinder valve further comprises a temperature relief insert in the vent passage. The insert comprises an insert body, a bore through the insert body, and a thermal relief material in the bore for blocking flow through the bore until a predetermined venting temperature is reached whereupon the thermal relief material is adapted to change from a solid state to a more liquid state to allow venting of the cylinder through the bore and the vent passage.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
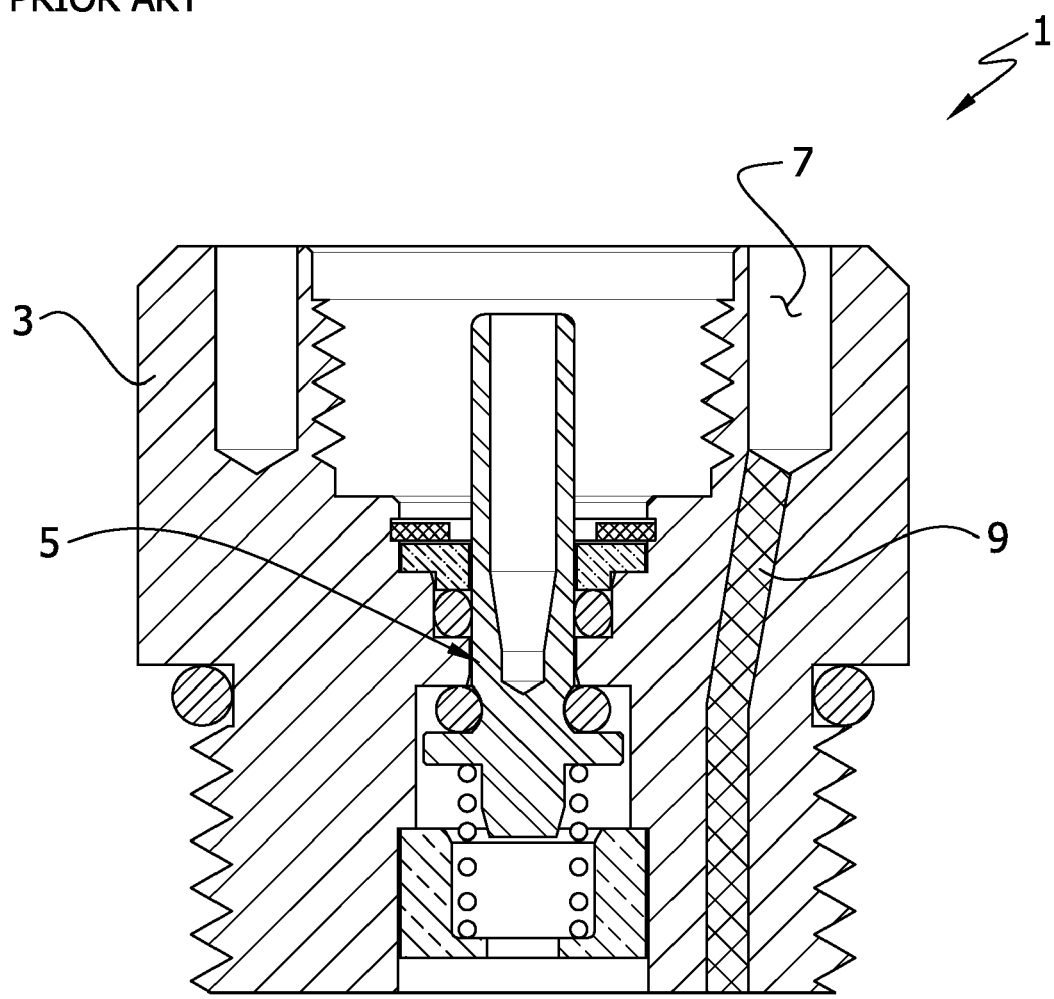
FIG. 1 is a cross section of a prior art cylinder valve.
Figure 2:
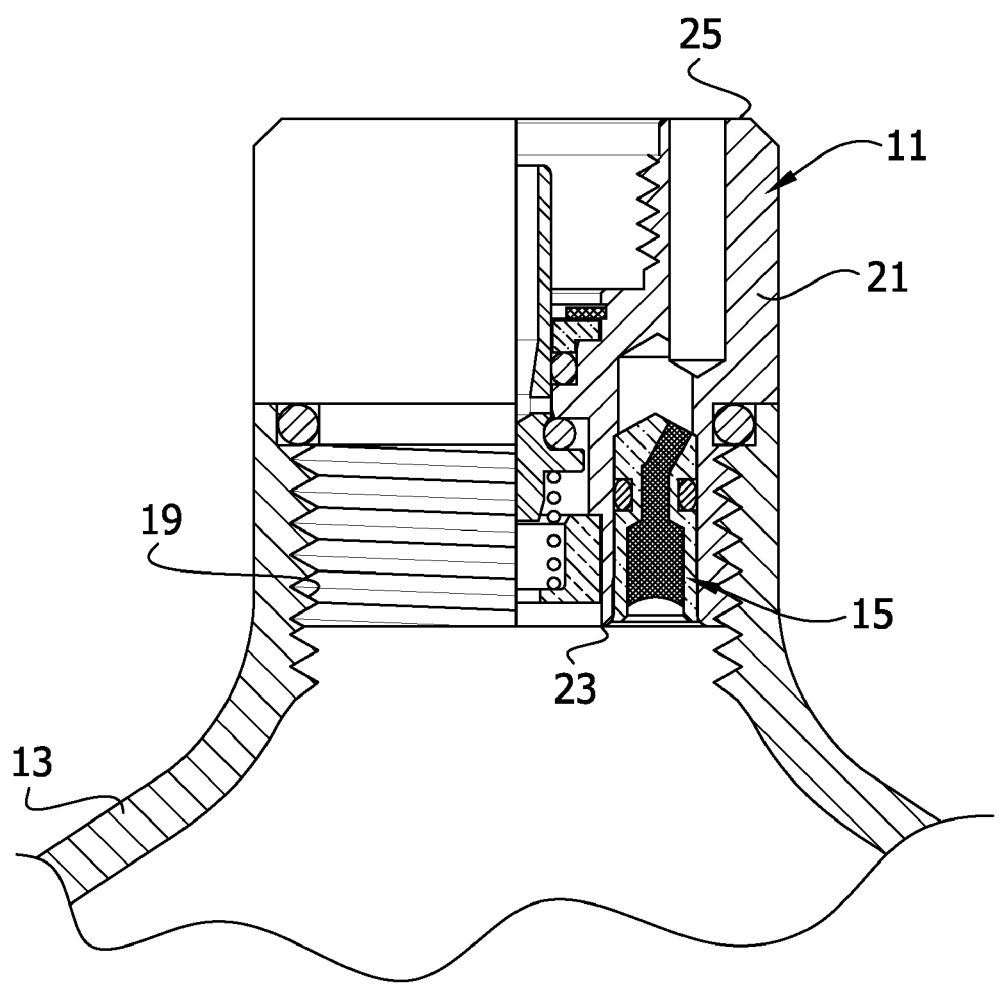
FIG. 2 is a cross section of a cylinder valve of the present invention attached to a cylinder.

Referring now to the drawings, and in particular FIG. 2, a cylinder valve of the present invention is indicated in its entirety by the reference numeral 11. The valve is shown mounted on a cylinder 13 containing a mixture of gases under pressure, including a very low amount of a gas that is used for calibration, such as hydrogen sulfide ($H_2S$). (This trace gas is hereinafter referred to as "calibration gas.") The cylinder valve 11 has a thermal relief feature 15 for venting gas from the cylinder 13 in the event the temperature of the cylinder and/or gas inside the cylinder rises to a level above a predetermined temperature.

Figure 3:
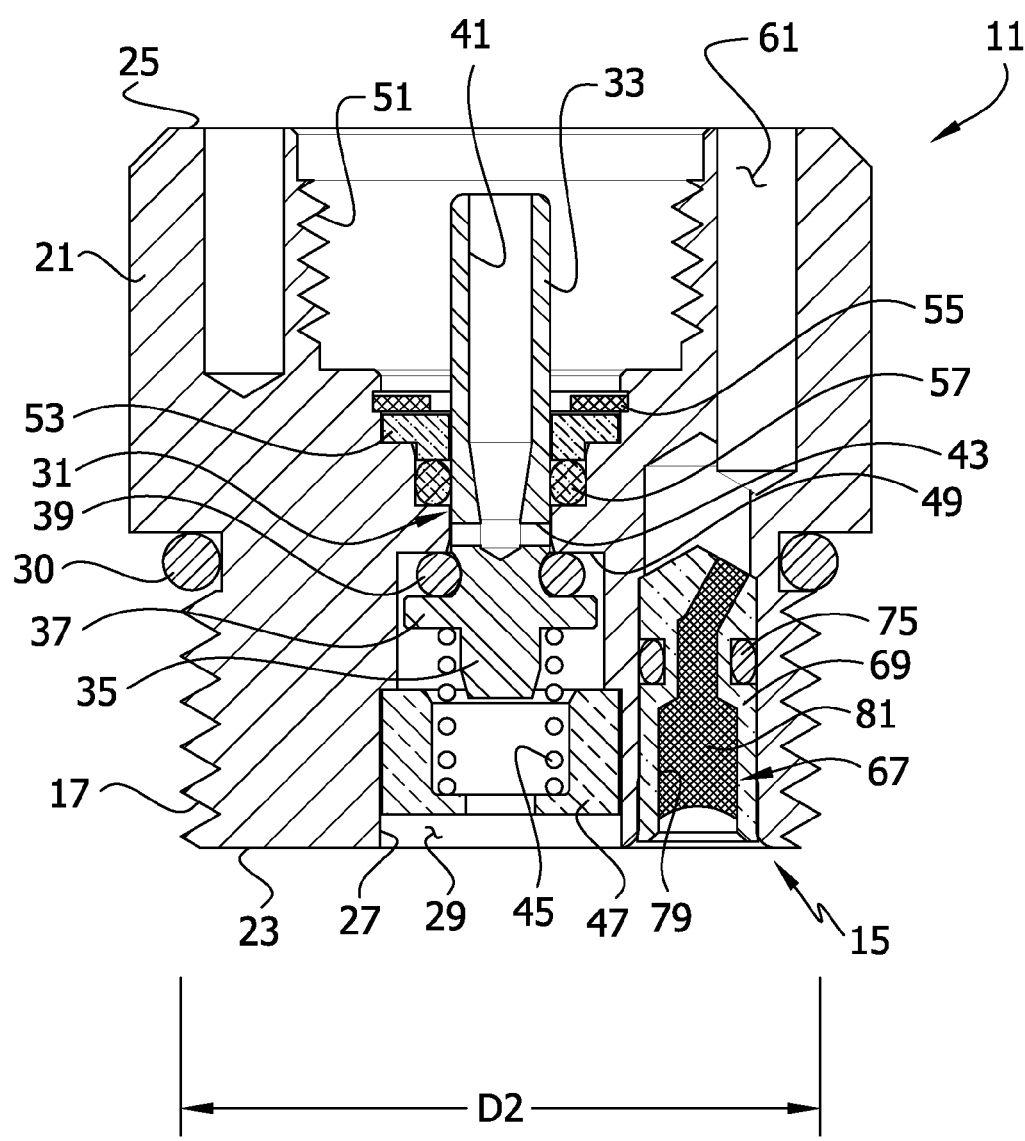
FIG. 3 is a cross section of the cylinder valve.
Figure 4:
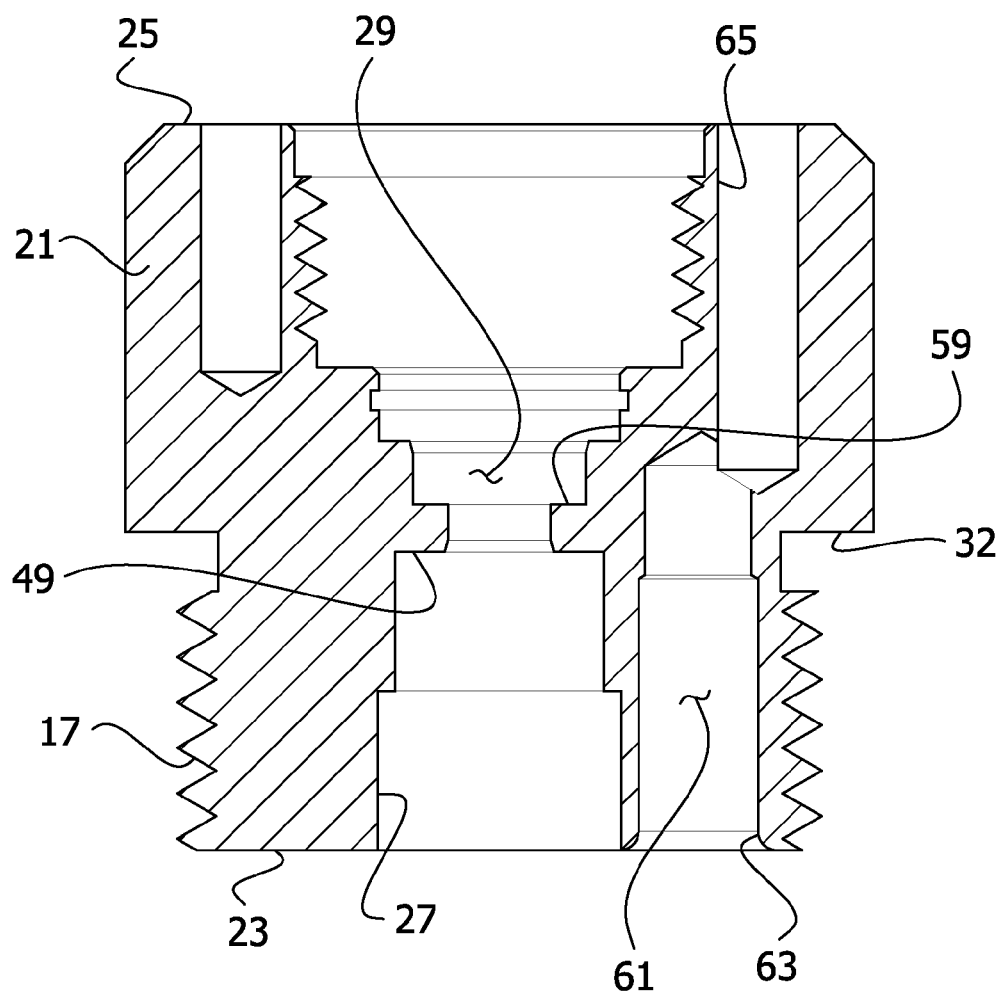
FIG. 4 is a cross section of the cylinder valve with internal valve components removed.

Referring to FIGS. 3 and 4, the cylinder valve 11 comprises a cylindrical valve body 21 having a front end 23, a back end 25, and a bore 27 defining a central flow passage 29 extending through the valve body from the front end to the back end for fluid communication with an interior of the cylinder 13 when the valve body is connected to the cylinder. The front portion 23 of the valve body 21 has external threads 17 which mate with internal threads 19 (FIG. 2) of the cylinder 13 to provide a releasable connection between the valve body and the cylinder. The connection is sealed by a sealing member 30 comprising an O-ring seated against an exterior shoulder 32 on the valve body 21.

A check valve 31 is mounted in the flow passage 29 and is movable between open and closed positions for permitting and blocking flow through the flow passage. The check valve 31 comprises a cylindrical stem 33 extending longitudinally of the passage 29, a head 35 at the front end of the stem, a radial flange 37 rearward of the head, and a valve seal 39 comprising an O-ring rearward of the flange. In the illustrated embodiment, the stem 33, head 35 and radial flange 37 are of one-piece construction. The stem 33, head 35 and flange 37 could each be separate pieces that are attached to each other without departing from the scope of the invention. The stem 33 has a longitudinal bore 41 extending forward from its rearward end. The longitudinal bore 41 communicates with a radial bore 43 extending transversely through the stem 33 at a location rearward of the valve seal 39. A coil spring 45 seated on a spring retainer 47 in the bore 27 urges the check valve 31 toward a closed position in which the valve seal 39 is seated against a valve seat 49 formed by an internal shoulder in the flow passage 29. Flow of gas from the cylinder 13 through the central flow passage 29 is blocked when the check valve 31 is in this closed position.

The rear portion of the central flow passage 29 has internal threads 51 which mate with external threads on a flow regulator (not shown). The configuration is such that when the regulator is threaded into its operating position on the cylinder valve 11, the stem 33 of the check valve 31 is moved forward to an open position in which the valve seal 39 is spaced forward of the valve seat 49 and the radial bore 43 in the stem communicates with the central flow passage 29 of the cylinder valve to permit flow of gas from the cylinder 13, as will be understood by those skilled in this field. Movement of the valve stem 33 is guided by an annular guide member 53 retained in the central flow passage 29 by a retaining ring 55. A sealing member 57 comprising an O-ring is positioned between the guide member 53 and an upstream internal shoulder 59 in the central flow passage. The sealing member 57 seals against the outside cylindrical surface of the valve stem 33.

Figure 5:
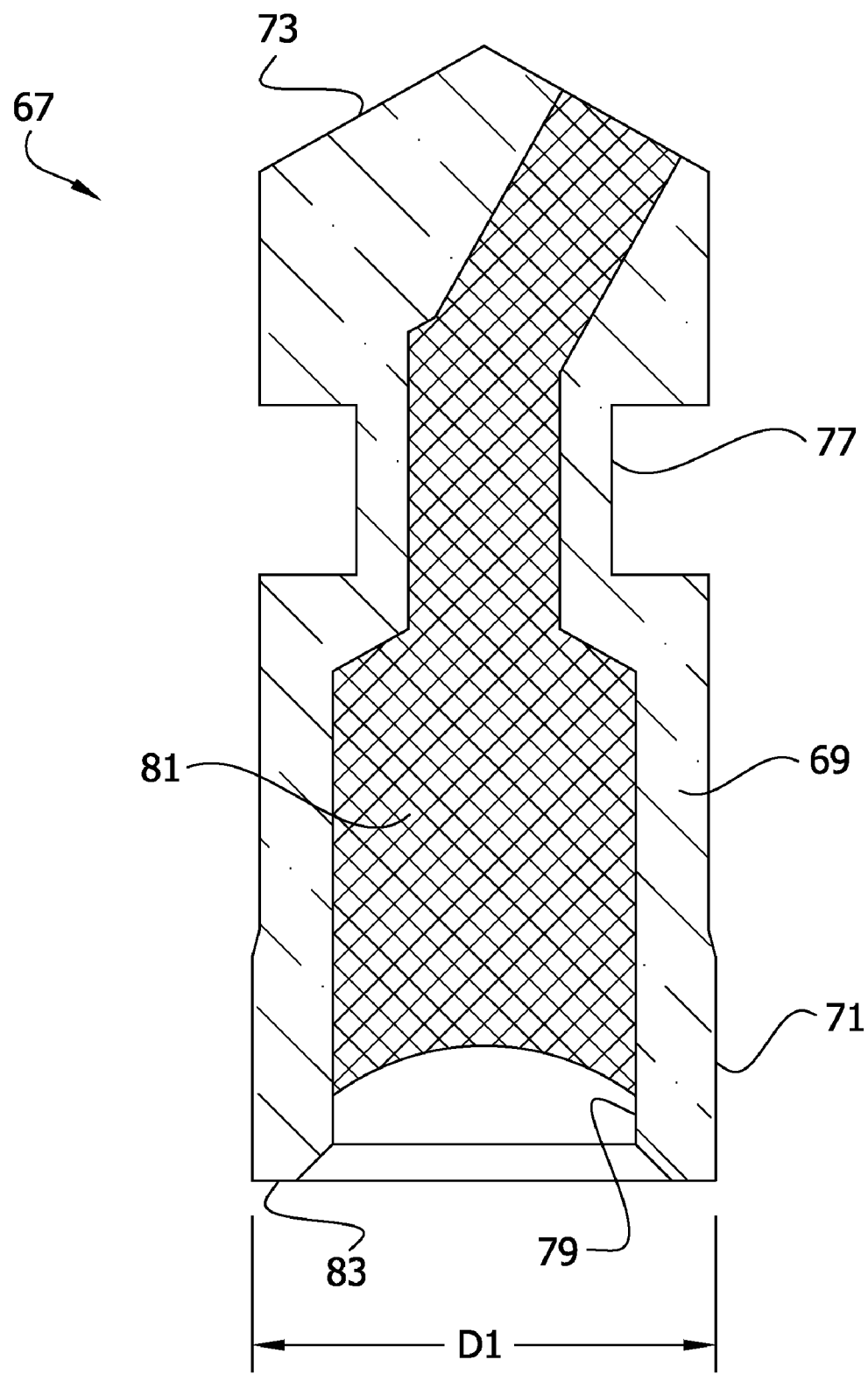
FIG. 5 is a cross section of a temperature relief insert of the cylinder valve.

Referring to FIGS. 4 and 5, a vent passage 61 extends through the valve body 21 from the front 23 of the valve body to the back 25 of the valve body generally alongside the central flow passage 29 but separate from the central flow passage. The vent passage 61 has a front section 63 and a rear section 65 offset in a radial direction from the front section. A temperature relief insert 67 is provided in the front section 23 of the vent passage 61. The insert 67 comprises an insert body 69 having a front end 71 adjacent the front surface of the valve body 21, and a tapered back end 73. A sealing member 75 (e.g., O-ring, see FIG. 3) is seated in an annular groove 77 around the exterior surface of the body 69 and seals against the wall of the vent passage 61. A longitudinal bore 79 extends through the insert body 69 and communicates at its forward end with the interior of the cylinder 13 and at its rearward end with the vent passage 61. The bore 79 is blocked with a plug 81 of thermal relief material which blocks flow through the bore 79 until a predetermined venting temperature is reached, at which point the thermal relief material is adapted to change from a solid state to a more liquid state to allow venting of the cylinder 13 through the bore 79 in the insert body 69 and the vent passage 61. The temperature relief material may be solder, for example, having a melting temperature in the range of 151° F.-218° F.

The valve body 21 is made only of a metallic material or materials not reactive to the calibration gas inside the cylinder 13. (As used herein, a metallic material is "not reactive" if there is no change in the chemical composition or concentration of the calibration gas when it contacts the metallic material. Conversely, a metallic material is "reactive" if there is a change in the chemical composition or concentration of the calibration gas when it contacts the metallic material.) For example, $H_2S$ reacts with brass. Therefore, if the calibration gas in the cylinder 13 is hydrogen sulfide, the valve body 21 is made of a metallic material not containing brass. In one embodiment, the valve body 21 is made of aluminum, which does not react with $H_2S$. Other non-reactive metals can also be used. For other calibration gases, the valve body 21 can be made of an appropriate metallic material or materials not reactive to such calibration gases.

Similarly, it is desirable that the check valve 31, spring 45, spring seat 47, guide member 53 and retaining ring 55 be made only of a metallic material or materials not reactive to the calibration gas or gases inside the cylinder 13. By way of example, these components may also be made of aluminum. The guide member 53 is not exposed to the cylinder gas and may be of a reactive material (e.g., brass) for greater strength, or it may be of a suitable non-reactive material (e.g., aluminum).

Solder does not easily or readily adhere to aluminum. Accordingly, when solder is used as the temperature relief material, the body 69 of the temperature relief insert 67 is made of more compatible metallic material. In one embodiment, this material is nickel-plated brass. The lead in the solder adheres well to this material, and the nickel plating isolates the brass against reaction with the $H_2S$ calibration gas in the cylinder 13. The overall surface area of the nickel plating exposed to the gas in the cylinder 13 is relatively small (e.g., no more than 0.240 $in^2$). As a result, the risk that the gas will be exposed to the underlying brass (or other reactive metallic material) through a chip or hole in the plating is substantially less then prior designs where many or all of the cylinder valve components are constructed of nickel-plated brass. In the illustrated embodiment, the only significant outer surface area of the insert body 69 exposed to the interior of the cylinder 13 is a front end surface area 83 which is relatively small compared to the overall front surface area of the cylinder valve 11. For example, as shown in FIG. 5, the front end of the body 69 of the relief valve insert 67 may have an outside diameter D1 less than one-third the outside diameter D2 (FIG. 3) of cylinder valve body 21 at its front end. By way of example but not limitation, D1 may be about 0.2 in. and D2 may be about 1.0 in. Using these dimensions, the front end of the valve body 21 may have a "wetted" surface area (i.e., a surface area exposed to cylinder gas) of about 2.0 $in^2$, and the temperature relief valve insert 67 may have a "wetted" surface area of about 0.24 $in^2$.

In use, the cylinder valve 11 is connected to the cylinder 13, and a regulator is connected to the cylinder valve to move the check valve 31 to its open position allowing flow of gas from the cylinder. In the event the temperature of the cylinder 13 and/or gases inside the cylinder exceeds the melting temperature of the solder plug 81 of the temperature relief valve insert 67, the solder will melt and allow the cylinder 13 to vent through the bore 79 of the insert 67 and the vent passage 61, thus relieving pressure in the cylinder. During use, the risk of a reaction between the calibration gas or gases in the cylinder 13 is minimized because most of the cylinder valve components are made of a metallic material or materials not reactive with the calibration gas or gases. The reactive metallic material in the temperature relief insert 67 is plated with a non-reactive material, such as a nickel-plating. Further, the overall surface area of the nickel-plating on the insert 67 that is exposed to the interior of the cylinder 13 is relatively small, thus minimizing the risk that the calibration gas will come into contact with the brass or other reactive material under the plating (e.g., in the event the integrity of the plating is breached, as by a hole created by a manufacturing defect or impact).

Having described the invention in detail, it will be apparent that modifications and variations are possible without departing from the scope of the invention defined in the appended claims.

The following non-limiting examples are provided to further illustrate the present invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A cylinder valve with a thermal relief feature for use with a cylinder containing fluid under pressure, said cylinder valve comprising:
   a valve body configured for releasable connection to the cylinder;
   said valve body having a front end, a back end, a flow passage extending through the valve body from the front end to the back end for fluid communication with an interior of the cylinder when the valve body is connected to the cylinder, and valve body surfaces which are exposed to fluid in the cylinder when the valve is connected to the cylinder;
   a valve in the flow passage movable between open and closed positions;
   a vent passage in the valve body separate from the flow passage for venting fluid under pressure from said cylinder; and
   a temperature relief insert in the vent passage, said insert comprising an insert body, a bore through the insert body, and a thermal relief material in the bore blocking flow through the bore until a predetermined venting temperature is reached whereupon said thermal relief material is adapted to change from a solid state to a more liquid state to allow venting of the cylinder through said bore and said vent passage;
   wherein the valve body does not contain brass; and
   wherein the insert body comprises brass covered by a metal plating not containing brass.

2. A thermal relief valve as set forth in claim 1 wherein said valve body is made of aluminum and said thermal relief material is solder.

3. A thermal relief valve as set forth in claim 2 wherein said metal plating comprises nickel.

4. A thermal relief valve as set forth in claim 1 wherein the front end of the valve body is generally cylindrical and has a first outside diameter, and wherein the insert body has a front end having a second outside diameter less than one-half the first outside diameter.

5. A thermal relief valve as set forth in claim 1 in combination with said cylinder, wherein the only surface area of said insert body exposed to the interior of the cylinder is a front end surface area no greater than about 0.240 in$^2$.

6. A thermal relief valve as set forth in claim 1 wherein said insert has a front end adjacent the front end of the valve body and a back end, and wherein the back end is tapered toward the back end of the valve body.

7. A cylinder containing a gaseous mixture under pressure, including a calibration gas, and a cylinder valve with a thermal relief feature installed on the cylinder, said cylinder valve comprising:
   a valve body having a releasable connection with the cylinder;
   said valve body having a front end, a back end, and a flow passage extending through the valve body from the front end to the back end to provide fluid communication with an interior of the cylinder;
   a valve in the flow passage movable between open and closed positions;
   a vent passage in the valve body separate from the flow passage for venting fluid under pressure from said cylinder; and
   a temperature relief insert in the vent passage, said insert comprising an insert body, a bore through the insert body, and a thermal relief material in the bore blocking flow through the bore until a predetermined venting temperature is reached whereupon said thermal relief material is adapted to change from a solid state to a more liquid state to allow venting of the cylinder through said bore and said vent passage;
   wherein the valve body does not include any metallic material reactive with said calibration gas; and
   wherein the insert body comprises a metallic material reactive with said calibration gas, and a metal plating covering said metallic material not reactive with said calibration gas.

8. A thermal relief valve as set forth in claim 7 wherein said valve body and said valve in the flow passage are made of aluminum and said thermal relief material is solder.

9. A thermal relief valve as set forth in claim 8 wherein said metal plating comprises nickel.

10. A thermal relief valve as set forth in claim 7 wherein the front end of the valve body is generally cylindrical and has a first outside diameter, and wherein the insert body has a front end having a second outside diameter less than one-half the first outside diameter.

11. A thermal relief valve as set forth in claim 7 wherein the only surface area of said insert body exposed to the interior of the cylinder is a front end surface area no greater than about 0.240 in$^2$.

* * * * *